(12) United States Patent
Pegoraro et al.

(10) Patent No.: US 12,208,974 B2
(45) Date of Patent: Jan. 28, 2025

(54) DISTRIBUTION APPARATUS FOR SOLID PARTICLES

(71) Applicant: MAIN TECH SRL, San Giorgio delle Pertiche (IT)

(72) Inventors: Renato Pegoraro, Cadoneghe (IT); Stefano Rostin, San Giorgio delle Pertiche (IT)

(73) Assignee: MAIN TECH SRL, San Giorgio delle Pertiche (IT)

( * ) Notice: Subject to any disclaimer, the term of this patent is extended or adjusted under 35 U.S.C. 154(b) by 76 days.

(21) Appl. No.: 18/036,301

(22) PCT Filed: Nov. 8, 2021

(86) PCT No.: PCT/IB2021/060315
§ 371 (c)(1),
(2) Date: May 10, 2023

(87) PCT Pub. No.: WO2022/101757
PCT Pub. Date: May 19, 2022

(65) Prior Publication Data
US 2023/0406648 A1  Dec. 21, 2023

(30) Foreign Application Priority Data
Nov. 11, 2020 (IT) .......................... 102020000026993

(51) Int. Cl.
*B65G 53/56* (2006.01)
*B29C 31/10* (2006.01)

(52) U.S. Cl.
CPC .............. *B65G 53/56* (2013.01); *B29C 31/10* (2013.01)

(58) Field of Classification Search
USPC ........................................ 406/182; 193/31 A
See application file for complete search history.

(56) References Cited

U.S. PATENT DOCUMENTS 3,195,960 A * 7/1965 Trythall ................. B65G 53/56
406/146
4,063,572 A * 12/1977 Anderegg .............. B65G 53/56
406/182

(Continued)

FOREIGN PATENT DOCUMENTS

BE       891106 A  *  3/1982  ............. B65G 53/56
DE    3935734 C2  *  3/1993  ............. D01G 23/08

(Continued)

*Primary Examiner* — Joseph A Dillon, Jr.
(74) *Attorney, Agent, or Firm* — Volpe Koenig

(57) ABSTRACT

Distribution apparatus (1) for distributing sliding solid material, comprising at least one first collector (10) comprising a first plurality of first ports (11) connected to one or more departure stations, at least one second collector (20) comprising a second plurality of second ports (21) connected to one or more arrival stations, at least one central connection (30) which is interposed between the first collector and the second collector, wherein each of the ports is connected to a respective pipe (13)(23) for transporting the sliding solid material from the first collector to the central connection or from the central connection to the second collector, and wherein each of the pipes can be controlled in terms of movement between an operating position and a rest position by means of rotation of at least one portion of the pipe.

10 Claims, 6 Drawing Sheets

(56) References Cited

U.S. PATENT DOCUMENTS

| | | | | |
|---|---|---|---|---|
| 4,529,335 A * | 7/1985 | Hilbert | ............... | B65G 51/32 |
| | | | | 406/182 |
| 4,911,340 A * | 3/1990 | Abom | ............... | F02M 21/12 |
| | | | | 406/52 |
| 5,069,583 A * | 12/1991 | Caldwell | ............... | B65G 53/56 |
| | | | | 406/182 |
| 5,165,826 A * | 11/1992 | Egbert | ............... | B65G 51/24 |
| | | | | 406/182 |
| 5,207,643 A * | 5/1993 | Davis | ............... | A61M 39/223 |
| | | | | 604/80 |
| 5,226,759 A * | 7/1993 | Hilmer | ............... | B65G 53/56 |
| | | | | 406/182 |
| 5,277,144 A * | 1/1994 | Moody | ............... | B63G 8/38 |
| | | | | 114/319 |
| 5,746,258 A * | 5/1998 | Huck | ............... | B65B 39/00 |
| | | | | 141/264 |
| 6,007,315 A * | 12/1999 | Busacchi | ............... | B29C 31/041 |
| | | | | 425/127 |
| 6,074,136 A * | 6/2000 | Steele | ............... | B65G 51/24 |
| | | | | 406/182 |
| 6,305,884 B1 * | 10/2001 | Lewis | ............... | B05B 7/1404 |
| | | | | 406/182 |
| 6,516,810 B1 * | 2/2003 | Haul | ............... | B65G 51/02 |
| | | | | 131/108 |
| 8,641,329 B2 * | 2/2014 | Barrios | ............... | B65G 51/24 |
| | | | | 406/182 |
| 9,969,569 B2 * | 5/2018 | Borkgren | ............... | A01C 15/04 |
| 11,549,599 B2 * | 1/2023 | Schmid | ............... | F16K 27/04 |
| 2015/0246773 A1 * | 9/2015 | Sundholm | ............... | B65G 53/56 |
| | | | | 193/29 |
| 2015/0345648 A1 * | 12/2015 | Henke | ............... | B65G 53/56 |
| | | | | 137/625 |

FOREIGN PATENT DOCUMENTS

| | | |
|---|---|---|
| DE | 4224408 C1 | 10/1993 |
| EP | 0995703 A1 | 4/2000 |
| EP | 1279472 A1 | 1/2003 |
| EP | 3505321 A1 | 7/2019 |
| GB | 1382347 A | 1/1975 |
| NL | 8500290 A * | 9/1986 ............. A01C 1/042 |

* cited by examiner

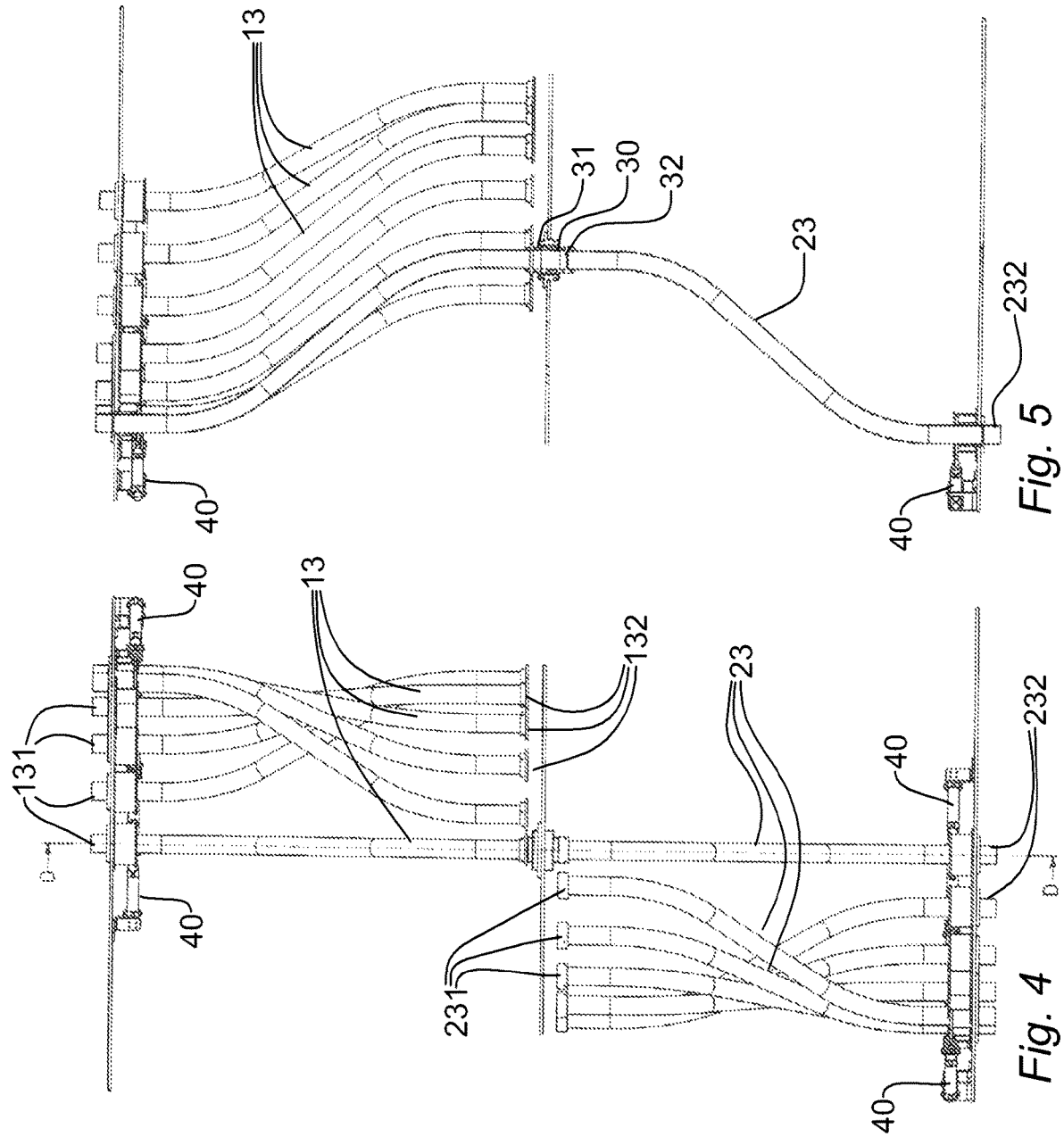

DISTRIBUTION APPARATUS FOR SOLID PARTICLES

The present invention relates to a distribution apparatus, in particular for distributing sliding solid material, such as granules, powders, grains, flakes, in particular granules of plastics material.

The present invention is used in a preferable though non-exclusive manner in the field of processing plastics materials in order to supply a predetermined processing station with materials from a predetermined source.

The term "processing" is intended to be understood to be an operation carried out on the sliding solid material, which is a drying or an actual conversion which uses the sliding solid material, as may be the case in injection-moulding or extrusion.

Conversion plants of the plastics materials are further provided with a plurality of moulding and/or extrusion machines, each of which typically comprises a hopper for charging the granules of plastics materials. In accordance with the type of product which has to be produced, the hopper of each machine has to be able to be charged with granules which are taken from a predetermined storage container. Each storage container may contain granules which differ from container to container as a result of polymer material, composition, colouring, granulometry, etc.

There are known a number of distribution apparatuses for sliding solid material. Such distribution apparatuses can operate by gravitational force, by drawing in or by pressure; for example, the charging of a hopper with predetermined polymer granules may be carried out by reduced pressure by means of suction of the polymer granules themselves by using a vacuum pump.

An example of a distribution apparatus is described, for example, in EP3505321 A1. This apparatus comprises a first collector having a plurality of inlet ports, a second collector having a plurality of outlet ports, a central connection which is interposed between the two collectors, a first tube which can be connected at one end to each of the inlet ports of the first collector and which is connected at the other end to the central connection, and a second tube which can be connected at one end to each of the outlet ports of the second collector and which is connected at the other end to the central connection. The apparatus allows the distribution of different materials which are contained in different storage containers to different processing stations because the first tube is permanently connected to the central connection at one end thereof but can be connected with the other end in an interchangeable manner to each of the inlet ports and, in a generally similar manner, the second tube is permanently connected to the central connection at an end thereof but can be connected with the other end in an interchangeable manner to each of the outlet ports.

One of the main disadvantages of such an apparatus is that it has a high risk of contamination between the various materials because the connection tubes between the inlet ports and the outlet ports are the same for all the types of material. In fact, if some granules of a material which is used in a given processing operation, for example, a moulding cycle, remain trapped in those tubes, with the change of material they can be drawn along by the new material to the conversion machines during a new moulding cycle, causing undesirable aesthetic or performance defects in the workpiece produced. This phenomenon is further intensified by the need to have production cycles which are more and more rapid and flexible.

Another example of a distribution apparatus is described, for example, in EP 0995703 A1. This apparatus comprises a central connection which is interposed between a first inlet section and a second outlet section, in the region of which it has an introduction opening and a discharge opening, respectively, a first series of inlet tubes which are connected at one end to storage containers and which can be selectively connected to the introduction opening by means of a radial movement and a second series of outlet tubes which are connected at one end to charging hoppers of moulding machines and which can be selectively connected to the discharge opening of the central connection by means of a radial movement. This system provides for using flexible tubes, which are usually made from plastics material and which are particularly subjected to wear, particularly with predetermined types of polymer materials, such as filled polymers, particularly with polymers filled with mineral fillers, such as, for example, glass fibres. This wear phenomenon may in some case even extend as far as on the loss of fragments of the plastics material from which the flexible tubes are constructed with resultant contamination of the processing material or breakage of the distribution apparatus itself.

The technical problem addressed and solved by the present invention is to provide a distribution apparatus for distributing sliding solid material which is structurally and functionally configured to overcome at least some and preferably all of the disadvantages set out with reference to the cited prior art.

This problem is solved by the invention by means of a distribution apparatus which is constructed according to one or more of the appended claims.

In a first aspect thereof, the present invention is directed towards a distribution apparatus for distributing sliding solid material, comprising:

at least one first collector comprising a first plurality of first ports for the passage of sliding solid material which can be connected to one or more departure stations for the sliding solid material and a first plurality of inlet pipes for transporting sliding solid material, at least one second collector comprising a second plurality of second ports for the passage of sliding solid material which can be connected to one or more arrival stations for the sliding solid material and a second plurality of outlet pipes for transporting sliding solid material, at least one central connection which is interposed between the first collector and the second collector and which has a first opening which is directed towards the first collector and a second opening which is directed towards the second collector, wherein each of the first ports is connected to a respective inlet pipe which is provided to transport the sliding solid material from the first collector to the central connection, and each of the second ports is connected to a respective outlet pipe which is provided to transport the sliding solid material from the central connection to the second collector, wherein each of the inlet pipes can be controlled in terms of movement between an operating position, in which the inlet pipe is connected with a first opening thereof to the first port and with a second opening thereof to the first opening of the central connection, and a rest position, in which the inlet pipe is connected with the first port and the second opening is disconnected from the first opening of the central connection, by means of rotation of at least one portion of the inlet pipe including the second opening, and/or wherein each of the outlet pipes can be controlled in terms of movement between an operating position, in which the outlet pipe is connected with a first opening thereof to the second opening of the central connection and with a second opening thereof to the second port, and a rest position, in which the outlet pipe is connected with the second port and the first opening of the outlet pipe is disconnected from the second opening of the central connection, by means of rotation of at least one portion of the outlet pipe including the first opening.

It is thereby possible to place each inlet pipe and/or each outlet pipe in communication with the central connection by means of a simple rotational movement.

Furthermore, this apparatus, having only the central connection in the various combinations of connection of each departure station to each arrival station as a single common section, advantageously minimizes the possibility that occurrences of contamination may occur between the materials used in different processing cycles.

In some variants, each of the inlet pipes is movable between the operating position and the rest position by means of rotation about the individual first opening and/or each of the outlet pipes is movable between the operating position and the rest position by means of rotation about the individual second opening.

In some construction variants, each of the inlet pipes and/or each of the outlet pipes is/are rigid.

Advantageously, by providing inlet pipes and outlet pipes of the rigid type, this apparatus is subjected to wear and therefore maintenance to a lesser extent.

In some construction variants, each of the first openings of the inlet pipes and/or of the outlet pipes is offset with respect to the second opening of the same inlet pipe or outlet pipe.

This allows each inlet pipe and/or outlet pipe to rotate between the operating position and the rest position, and vice versa, without there being any interference with the remaining pipes.

In some variants, the apparatus further comprises a first plurality of first actuator means for controlling the movement of the second openings of the inlet pipes between the operating position and the rest position and/or a second plurality of first actuator means for controlling the movement of the first openings of the outlet pipes between the operating position and the rest position.

Advantageously, these first actuator means allow the movement of the second openings of the inlet pipes between the operating position and the rest position and/or the movement of the first openings of the outlet pipes between the operating position and the rest position without any manual intervention by an operator.

In some embodiments, the first plurality of first actuator means for controlling the movement of the second openings of the inlet pipes are supported on the first collector and/or the second plurality of first actuator means for controlling the movement of the first openings of the outlet pipes are supported on the second collector.

This advantageously makes the distribution apparatus itself more compact and functional.

Preferably, the inlet pipes and the outlet pipes have a circular cross-section.

This allows any locations inside these pipes where the sliding solid material could become accumulated to be reduced.

In some embodiments, the first plurality of first ports for the passage of sliding solid material are arranged on a first circumference on the first collector and/or the second plurality of second ports for the passage of sliding solid material are arranged on a second circumference on the second collector.

This allows the inlet pipes and/or the outlet pipes to be made substantially identical to each other, with an evident positive effect on the production and maintenance costs, and the occurrences of interference are eliminated between an inlet pipe or outlet pipe and the remaining inlet or outlet pipes during the movement thereof between the operating position and the rest position.

In these embodiments, the centre of the first circumference, the centre of the second circumference and the first opening and second opening of the central connection are preferably coaxial.

This allows a distributor having a form which is generally more compact to be provided and allows any phenomena of sliding solid material becoming trapped in the various pipes to be reduced.

In some embodiments, at least one of the inlet pipes and preferably all of them comprise(s) closure valve means. This advantageously allows an interruption in the flow of the sliding solid material in a predetermined inlet pipe or in each of the inlet pipes directly before a change in the moulding cycle which involves a change of the material itself occurs. If this were not the case, when the inlet pipe which is in communication with the central connection and therefore the sliding solid material which is transported to the central connection and then to the outlet pipe is changed, the first material could fall and contaminate the surrounding environment.

Each of the first ports and each of the second ports is preferably provided with an annular fluid-tight seal.

This allows a reduction of any charge losses, particularly when the distributor works with suction or pressure.

Preferably, the first opening and the second opening of the central connection are provided with an annular fluid-tight seal.

In this case, this arrangement also allows a reduction of any charge losses, particularly when the distributor works with suction or pressure.

In some embodiments, the distribution apparatus comprises a support frame which can support the first collector, the second collector and the central connection. In this manner, the distribution apparatus is more rigid and where applicable movable as required.

Preferably, the distribution apparatus further comprises a controller which can store an ordered succession for connection requests between a predetermined first port of the first collector and a predetermined second port of the second collector and can control the first actuator means in order to place in communication the predetermined first port of the first collector with a predetermined second port of the second collector on the basis of a predetermined order.

This advantageously makes the change of materials automatic and rapid, ensuring production or processing cycles which are quicker.

In some embodiments, there is present on the central connection a connection device between each of the second openings of the inlet pipes and the first opening of the central connection and between each of the first openings of the outlet pipes and the second opening of the central connection, this connection device comprising two telescope-like sleeves which engage in a sliding manner one in the other and the opposite ends of which define the first opening and the second opening of the central connection, and a movement member for the relative sliding of the two telescope-like sleeves.

Preferably, the telescope-like sleeves can be controlled in terms of relative sliding between an extended configuration and a retracted configuration by pneumatic control chambers and have a plurality of through-holes between the pneumatic control chambers and the interior of the telescope-like sleeves, these holes being through-holes which open in the pneumatic control chambers when the telescope-like sleeves slide in relative terms between the extended configuration and the retracted configuration and are inaccessible when the telescope-like sleeves are in an extended configuration.

The features and advantages of the invention will be better appreciated from the following detailed description of a preferred embodiment thereof which is illustrated by way of non-limiting example with reference to the appended drawings, in which:

FIG. 4 is a schematic, perspective side view of the distribution apparatus of FIG. 2;

FIG. 5 is a schematic, perspective side view of the distribution apparatus along the section D-D of FIG. 4;

With reference to the appended Figures, there is generally designated 1 a distribution apparatus for distributing sliding solid material according to the present invention.

Figure 1:
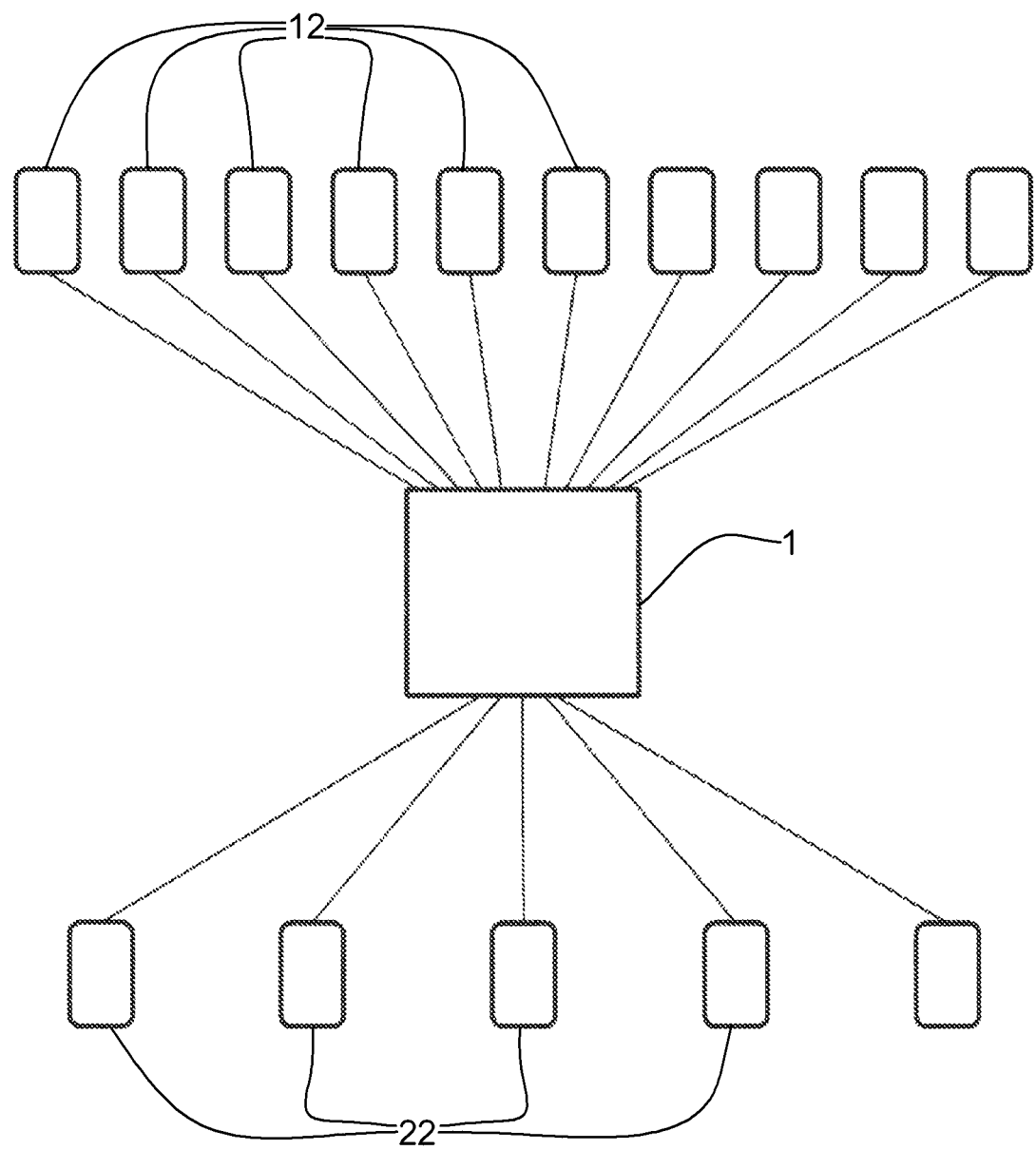
FIG. 1 is a schematic view of a processing plant for plastics materials.

FIG. 1 schematically illustrates a processing plant for plastics materials. This plant typically comprises a plurality of departure stations 12, typically storage containers for the sliding solid material, a distribution apparatus 1 and a plurality of arrival stations 22, typically processing stations for the sliding solid material, such as dryers, injection presses or extruders. Each departure station 12 and each arrival station 22 is connected separately from the others to the distribution apparatus 1.

Figure 2:
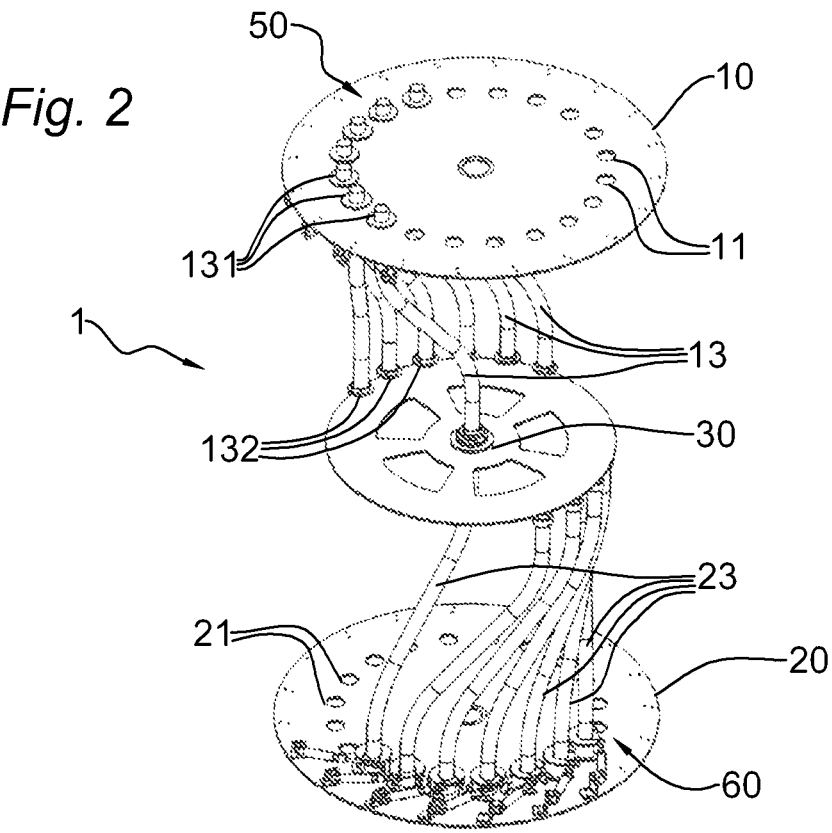
FIG. 2 is a schematic, perspective plan view of a distribution apparatus for distributing sliding solid material, which is constructed according to the present invention.

FIG. 2 illustrates a distribution apparatus 1 comprising a first collector 10 having a first plurality of first ports 11 for the passage of sliding solid material which can be connected to one or more departure stations 12 and a first plurality of inlet pipes 13 for transporting sliding solid material, a second collector 20 having a second plurality of second ports 21 for the passage of sliding solid material which can be connected to one or more arrival stations 22 and a second plurality of outlet pipes 23 for transporting sliding solid material, and a central connection 30 which is interposed between the first collector 10 and the second collector 20.

The first plurality of first ports 11 are arranged on a first circumference 50 on the first collector 10 and the second plurality of second ports 21 are arranged on a second circumference 60 on the second collector 20.

Figure 3:
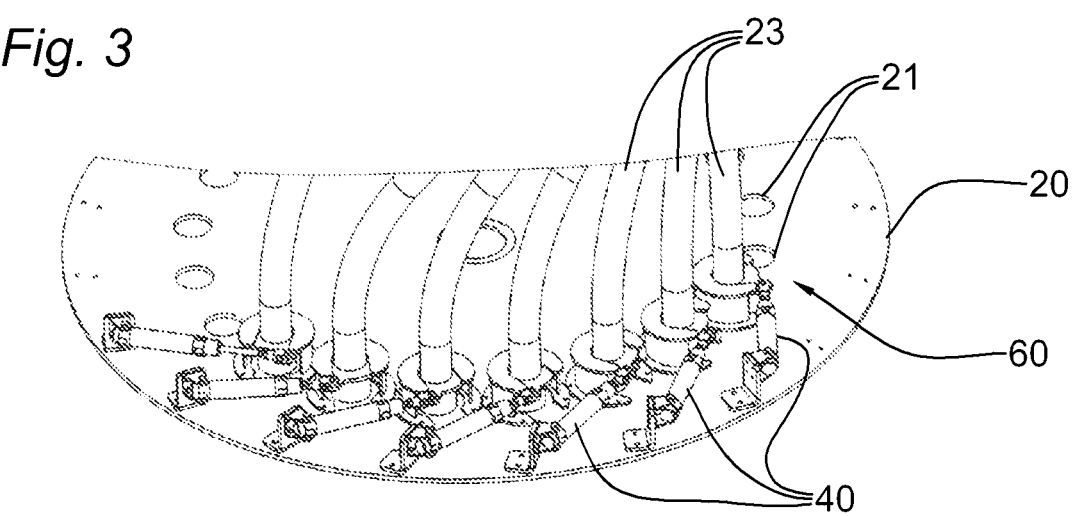
FIG. 3 is a schematic, perspective plan view of a detail of the distribution apparatus of FIG. 2.

The central connection 30 further has a first opening 31 which is directed towards the first collector 10 and a second opening 32 which is directed towards the second collector 20 (FIG. 3).

The centre of the first circumference 50, the centre of the second circumference 60 and the first opening 31 and the second opening 32 of the central connection 30 are coaxial.

Each of the first ports 11 can be connected to one or more departure stations; similarly, each of the second ports 21 can be connected to one or more arrival stations.

Each of the first ports 11 is further connected to a respective inlet pipe 13 which is preferably rigid and which is provided to transport the sliding solid material from the first collector 10 to the central connection 30. In a generally similar manner, each of the second ports 21 is connected to a respective outlet pipe 23 which is preferably rigid and which is provided to transport the sliding solid material from the central connection 30 to the second collector 20.

In this embodiment, the inlet pipes 13 and the outlet pipes 23 have a circular cross-section. Each inlet pipe 13 extends along a curved axis between a first opening 131, which is open at a first end of the inlet pipe 13, and a second opening 132 which is open at the longitudinally opposite end of the inlet pipe 13. Similarly, each outlet pipe 23 extends along a curved axis between a first opening 231, which is open at a first end of the outlet pipe 23, and a second opening 232 which is open at the longitudinally opposite end of the outlet pipe 23.

As may be noted in FIG. 2, each of the first openings 131 of the inlet pipe 13 is offset with respect to the second opening 132 of the same inlet pipe 13 and each of the first openings 231 of the outlet pipes 23 is offset with respect to the second opening 232 of the same outlet pipe 23.

Each of the inlet pipes 13 can be controlled in terms of movement between an operating position, in which it is connected with a first opening 131 thereof to the respective first port 11 and with a second opening 132 thereof to the first opening 31 of the central connection 30, and a rest position, in which it is connected with the first port 11 and the second opening 132 is disconnected from the first opening 31 of the central connection 30.

Similarly, each of the outlet pipes 23 can be moved between an operating position, in which it is connected with a first opening 231 thereof to the second opening 32 of the central connection 30 and with a second opening 232 thereof to a second port 21, and a rest position, in which it is connected with the second port 21 and the first opening 231 is disconnected from the second opening 32 of the central connection 30.

In an embodiment, this movement between an operating position and a rest position is carried out by means of rotation of each inlet pipe 13 about the individual first opening 131 and each outlet pipe 23 about the individual second opening 232.

This movement can be carried out by means of an actuator means 40, for example, a hydraulic cylinder (FIG. 3). In particular, for the movement of each inlet pipe 13 there is provided an actuator means 40 which is supported on the first collector 10 while, for the movement of each outlet pipe 23, there is provided an actuator means 40 which is supported on the second collector 20.

The offset arrangement between the first opening 131 and the second opening 132 of the inlet pipes 13 and between the first opening 231 and the second opening 232 of the outlet pipes 23, together with the curved formation, which is generally S-like, of the inlet pipes 13 and outlet pipes 23 is such that, during the movement of a predetermined inlet pipe 13 or outlet pipe 23 between the operating position and the rest position, the remaining inlet pipes 13 or outlet pipes 23 do not interfere, as shown in FIG. 4 and in FIG. 5.

Figure 6:
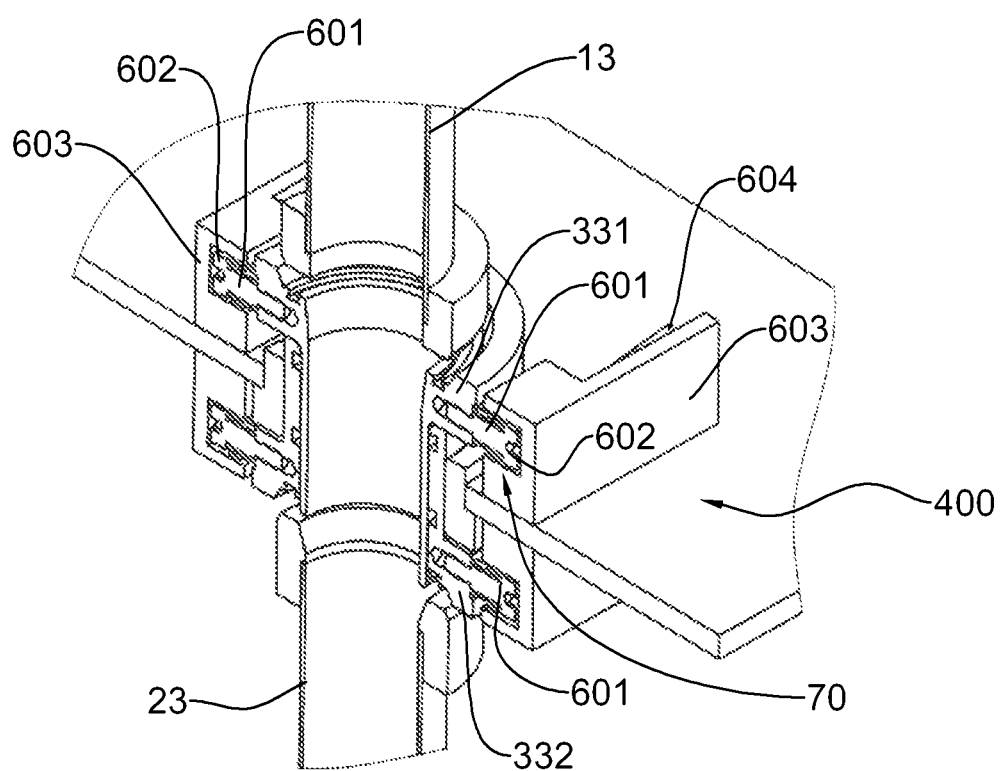
FIG. 6 is a schematic, perspective sectioned plan view of a detail of the distribution apparatus of FIG. 2 according to a first embodiment.

FIG. 6 shows a first embodiment of the connection mechanism of the second opening 132 of an inlet pipe 13 to the first opening 31 of the central connection 30 and of the first opening 231 of an outlet pipe 23 to the second opening 32 of the central connection 30.

There is present on the central connection 30 a connection device 400 for the connection between each of the second openings 132 of the inlet pipes 13 and the first opening 31 of the central connection 30 and between each of the first openings 231 of the outlet pipes 23 and the second opening 32 of the central connection 30.

The connection device 400 comprises two telescope-like sleeves 331, 332 which engage in a sliding manner one in the other and the opposite ends of which define the first opening 31 and the second opening 32 of the central connection 30, and a movement member 70 for the relative sliding of the two telescope-like sleeves 331, 332.

In this embodiment, the movement member 70 comprises pins 601, guides 602 and a plurality of second actuator means. There extend from both the telescope-like sleeves 331, 332 two pins 601 which have idler wheels 602. The movement member 70 comprises two guides 603 for each telescope-like sleeve 331, 332; these guides 603 are placed at opposite sides with respect to the respective telescope-like sleeve 331, 332. Each guide 603 has a support ramp 604, on which each idler wheel 602 is supported. Each guide 603 is controlled in terms of linear movement by one of the second actuator means (not illustrated in the Figure), which are typically hydraulic or pneumatic actuators of the cylinder/piston type, in such a manner that, with this movement of the guide 603, the idler wheel 602 is automatically raised and lowered and accordingly the telescope-like sleeve 331, 332 to which the idler wheel 602 is fixed. The telescope-like sleeves 331, 332, being slidingly engaged in each other, thereby change from an extended configuration to a retracted configuration.

When a specific inlet pipe 13 and a specific outlet pipe 23 are in the operating position thereof, and therefore have the second opening 132 and the first opening 231 aligned relative to the first opening 31 and the second opening 32 of the central connection 30, respectively, they then have to be connected to the first opening 31 and the second opening 32 of the central connection 30, respectively.

The connection is brought about by means of linear movement of each guide 603 and therefore resultant relative sliding of the two telescope-like sleeves 331, 332 with respect to each other towards an extended configuration until becoming joined in a sealing manner with the second opening 132 of the inlet pipe 13 and the first opening 231 of the outlet pipe 23. There is thereby provided the connection of the second opening 132 of a specific inlet pipe 13 in the operating position thereof to the first opening 31 of the central connection 30 and, in a generally similar manner, of the first opening 231 of a specific outlet pipe 23 in the operating position thereof to the second opening 32 of the central connection 30.

In order to disconnect the second opening 132 of the inlet pipe 13 from the first opening 31 of the central pipe 30 and the first opening 231 of the outlet pipe 23 from the second opening 32 of the central pipe 30, the guides 603 are controlled in terms of movement in the opposite direction so that the two telescope-like sleeves 331, 332 return from the extended configuration to the retracted configuration.

Figure 7:
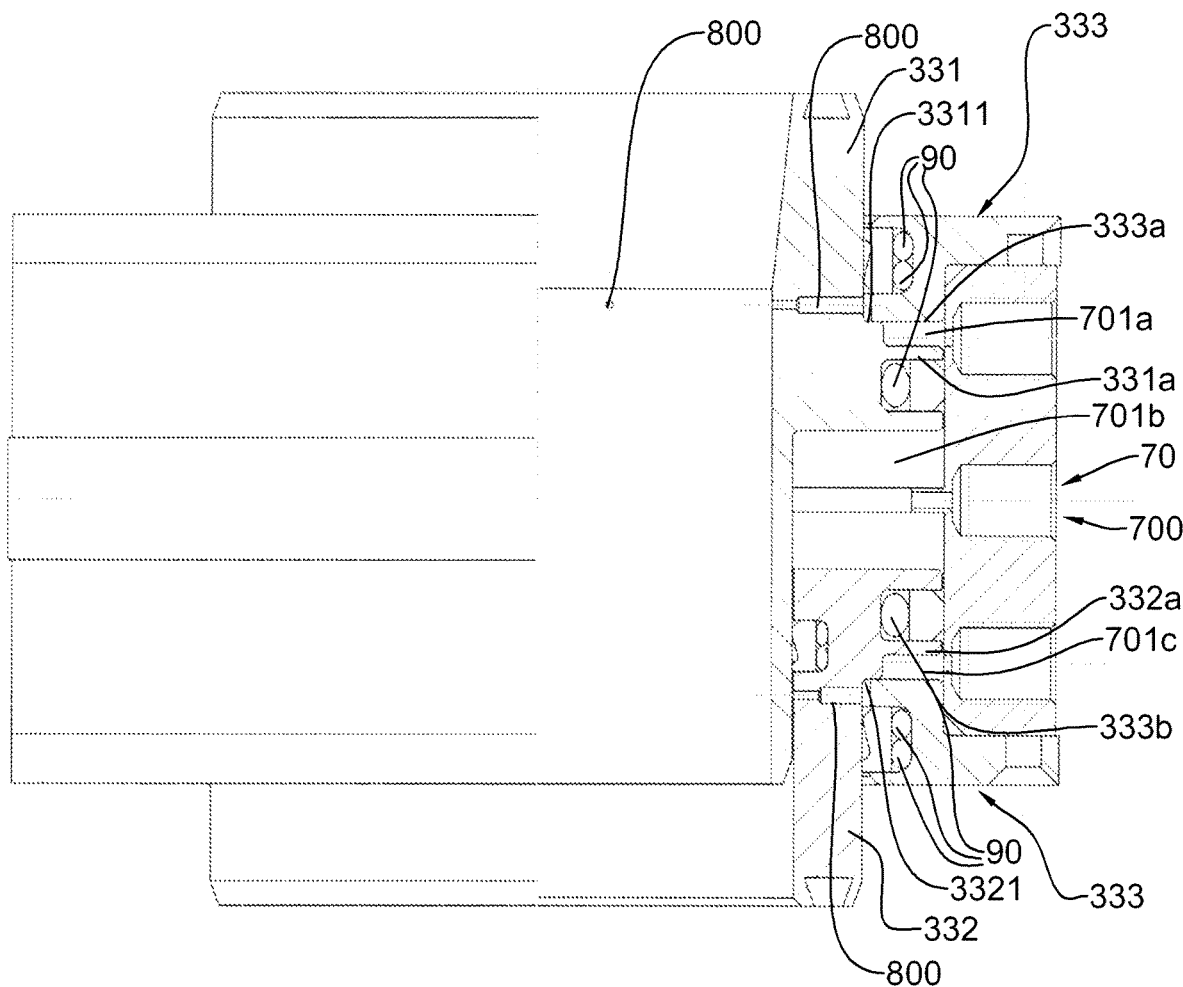
FIG. 7 is a schematic plan view of a detail of the distribution apparatus of FIG. 2 according to another embodiment.

FIG. 7 shows an additional embodiment of the connection mechanism of the second opening 132 of an inlet pipe 13 to the first opening 31 of the central connection 30 and of the first opening 231 of an outlet pipe 23 to the second opening 32 of the central connection 30.

In this embodiment, there is also present on the central connection 30 a connection device 400 for the connection between each of the second openings 132 of the inlet pipes 13 and the first opening 31 of the central connection 30 and between each of the first openings 231 of the outlet pipes 23 and the second opening 32 of the central connection 30. In this case, the connection device 400 also comprises two telescope-like sleeves 331, 332 which are slidingly engaged one in the other and the opposite ends of which define the first opening 31 and the second opening 32 of the central connection 30 and a movement member 70 for the relative sliding action of the two telescope-like sleeves 331, 332 inside a fixed block 333 and can move between an extended formation and a retracted formation; in the specific case of FIG. 7, the telescope-like sleeves 331, 332 are in an extended configuration.

In this embodiment, the movement member 70 is capable of moving the two telescope-like sleeves 331, 332 between the extended configuration and the retracted configuration and comprises a pneumatic control 700 which, by means of respective connections, is connected to the toroidal pneumatic control chambers 701 which extend about the two telescope-like sleeves 331, 332 inside the fixed block 333.

In particular, a pneumatic control chamber 701a extends between a flange 331a of the first sleeve 331 and a flange 333a of the fixed block 333, a second central pneumatic control chamber 701b extends between the flange 331a of the first sleeve 331 and a flange 332a of the second sleeve 332 and, finally, a third pneumatic control chamber 701c extends between the flange 332a of the second sleeve 332 and a flange 333b of the fixed block 333.

The fluid-tightness of the pneumatic control chambers 701a-701c is ensured by the presence of annular fluid-tight seals 90.

When a pair of specific inlet pipes 13 and outlet pipes 23 are in the operating position thereof, and therefore have the second opening 132 and the first opening 231 aligned with the first opening 31 and the second opening 32 of the central connection 30, respectively, they then have to be connected with the first opening 31 and to the second opening 32 of the central connection 30. The connection is brought about when the pneumatic control 700 controls the movement of the two telescope-like sleeves 331, 332 from a retracted position to an extended position by means of the central pneumatic control chamber 701b. In fact, at the time at which a fluid is injected, for example, compressed air, into the central pneumatic control chamber 701b, this fluid applies the pressure thereof to the flanges 331a and 332a, urging the two telescope-like sleeves 331, 332 away from each other as far as a travel limit stop 3311, 3321 thereof. When the two telescope-like sleeves 331, 332 reach the travel limit stop 3311, 3321 thereof, the first opening 31 of the central connection 30 is connected in a fluid-tight manner to the second opening 132 of the inlet pipe 13 and the second opening 32 of the central connection 30 is connected in a fluid-tight manner to the first opening 231 of the outlet pipe 23.

In order to disconnect the second opening 132 of the inlet pipe 13 from the first opening 31 of the central pipe 30 and the first opening 231 of the outlet pipe 23 from the second opening 32 of the central pipe 30, the fluid which is present in the central pneumatic control chamber 701b is expelled, for example, by means of a venting valve, and, at the same time, the same fluid is injected into the other two pneumatic control chambers 701a and 701c.

The pressure inside the pneumatic control chambers 701a and 701c causes the flanges 331a and 332a to move away from the flanges 333a and 333b of the fixed block 333, respectively, moving the two telescope-like sleeves 331, 332 from the extended position to the retracted position. At this point, the second opening 132 of the inlet pipe 13 is disconnected from the first opening 31 of the central pipe 30 and the first opening 231 of the outlet pipe 23 is disconnected from the second opening 32 of the central pipe 30.

Preferably, the telescope-like sleeves 331, 332 have a plurality of through-holes 800 which place in communication the interior of the telescope-like sleeves 331, 332, where the sliding solid material moves, with the pneumatic control chambers 701a and 701c when the telescope-like sleeves 331, 332 are in a retracted position or in any case when they are moving between the extended configuration and the retracted configuration. Conversely, however, the through-holes 800 are inaccessible when the telescope-like sleeves 331, 332 are in the extended configuration.

This advantageously allows the through-holes 800 to act as blowing nozzles which blow air into the central connection 30 and prevents the accumulation of granules or powders during the changes of material which is transferred by the distribution apparatus 1.

Figure 8:
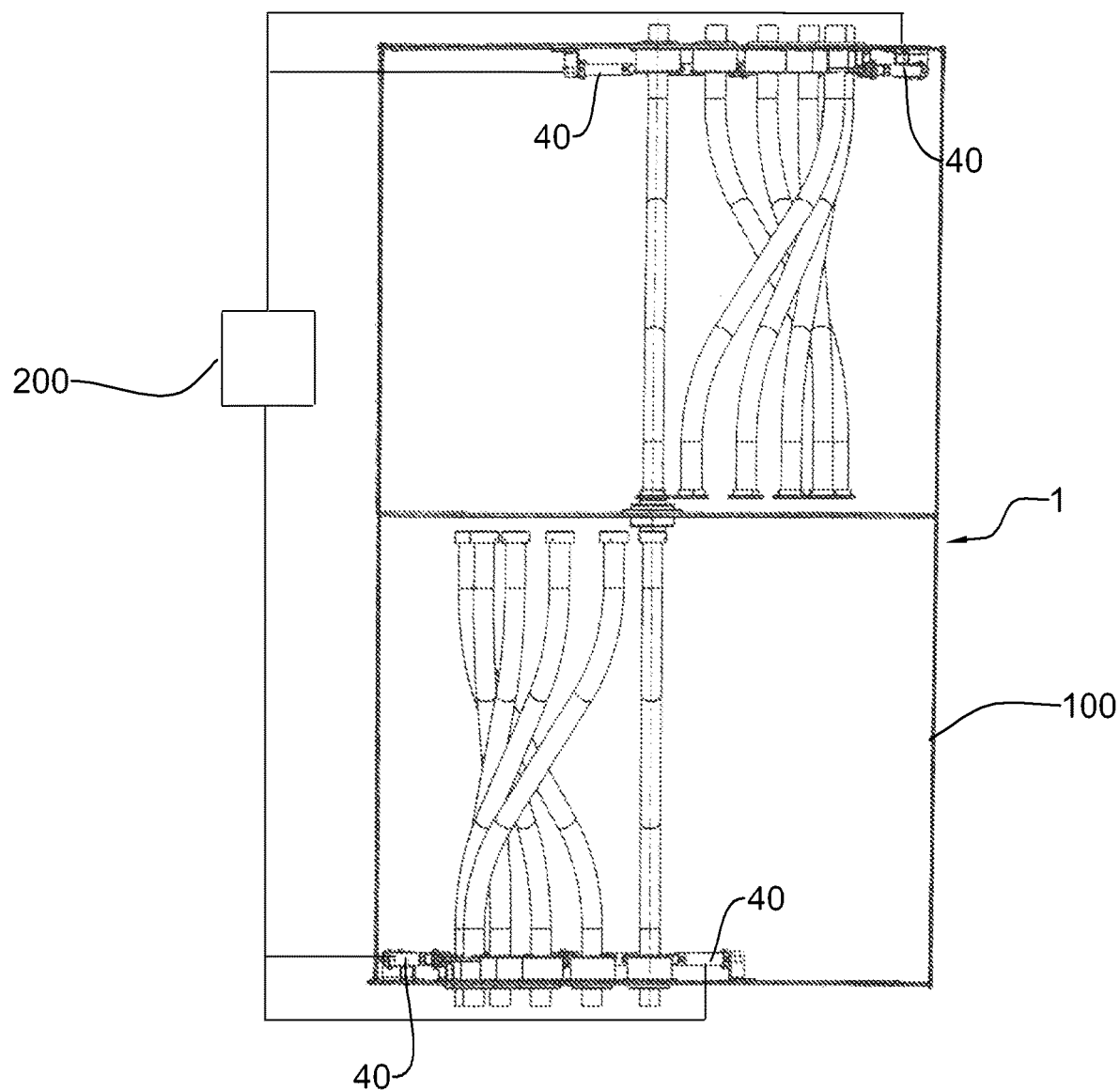
FIG. 8 is another schematic, perspective side view of the distribution apparatus of FIG. 2.

In some embodiments, such as the one set out in FIG. 8, the distribution apparatus 1 comprises a support frame 100 for the first collector 10, the second collector 20 and the central connection 30; preferably, this support frame 100 keeps the centre of the first circumference 50 on the first collector 10, the centre of the second circumference 60 on the second collector 20, the first opening 31 and the second opening 32 of the central connection 30 coaxial.

The distribution apparatus further comprises a controller 200, which is typically a microprocessor and which is capable of storing an ordered succession of connection requests between a predetermined first port 11 of the first collector 10 and a predetermined second port 21 of the second collector 20 and of controlling the first actuator means 40 in order to place in communication this first port 11 with this second port 21 of the second collector 20 on the basis of a predetermined order.

Naturally, a person skilled in the art may apply to the above-described invention, in order to satisfy specific and contingent application requirements, additional modifications and variants which are in any case included within the protective scope as defined by the appended claims.

The invention claimed is:

1. A distribution apparatus (1) for distributing sliding solid material, comprising:
at least one first collector (10) comprising a first plurality of first ports (11) for the passage of sliding solid material which can be connected to one or more departure stations (12) for the sliding solid material and a first plurality of inlet pipes (13) for transporting sliding solid material,
at least one second collector (20) comprising a second plurality of second ports (21) for the passage of sliding solid material which can be connected to one or more arrival stations (22) for the sliding solid material and a second plurality of outlet pipes (23) for transporting sliding solid material,
at least one central connection (30) which is interposed between the first collector (10) and the second collector (20) and which has a first opening (31) which is directed towards the first collector (10) and a second opening (32) which is directed towards the second collector (20),
wherein each of the first ports (11) is connected to a respective inlet pipe (13) which is provided to transport the sliding solid material from the first collector (10) to the central connection (30), and each of the second ports (21) is connected to a respective outlet pipe (23) which is provided to transport the sliding solid material from the central connection (30) to the second collector (20), wherein each of the inlet pipes (13) is controllable in terms of movement between an operating position, in which the inlet pipe (13) is connected with a first opening (131) thereof to the first port (11) and with a second opening (132) thereof to the first opening (31) of the central connection (30), and a rest position, in which the inlet pipe (13) is connected with the first port (11) and the second opening (132) is disconnected from the first opening (31) of the central connection (30), by means of rotation of at least one portion of the inlet pipe (13) including the second opening (132) and/or
wherein each of the outlet pipes (23) is controllable in terms of movement between an operating position, in which the outlet pipe (23) is connected with a first opening (231) thereof to the second opening (32) of the central connection (30) and with a second opening (232) thereof to the second port (21), and a rest position, in which the outlet pipe (23) is connected with the second port (21) and the first opening (231) of the outlet pipe (23) is disconnected from the second opening (32) of the central connection (30), by means of rotation of at least one portion of the outlet pipe (23) including the first opening (231).

2. The distribution apparatus according to claim 1, wherein each of the inlet pipes (13) is movable between the operating position and the rest position by means of rotation about the individual first opening (131) and/or each of the outlet pipes (23) is movable between the operating position and the rest position by means of rotation about the individual second opening (232).

3. The distribution apparatus according to claim 1, wherein each of the inlet pipes (13) and/or each of the outlet pipes (23) is/are rigid.

4. The distribution apparatus according to claim 1, wherein each of the first openings (131, 231) of the inlet pipes (13) and/or of the outlet pipes (23) is offset with respect to the second opening (132, 232) of the same inlet pipe (13) or outlet pipe (23).

5. The distribution apparatus according to claim 1, further comprising a first plurality of first actuators (40) that control the movement of the second openings (132) of the inlet pipes (13) between the operating position and the rest position and/or a second plurality of first actuators (40) that control the movement of the first openings (231) of the outlet pipes (23) between the operating position and the rest position.

6. The distribution apparatus according to claim 5, wherein the first plurality of first actuators (40) are supported on the first collector (10) and/or the second plurality of first actuators (40) are supported on the second collector (20).

7. The distribution apparatus according to claim 1, wherein the first plurality of first ports (11) for the passage of sliding solid material are arranged on a first circumference (50) on the first collector (10) and/or the second plurality of second ports (21) for the passage of sliding solid material are arranged on a second circumference (60) on the second collector (20).

8. The distribution apparatus according to claim 7, wherein the center of the first circumference (50), the center of the second circumference (60) and the first opening (31) and second opening (32) of the central connection (30) are coaxial.

9. The distribution apparatus according to claim 1, further comprising on the central connection (30) a connection device (400) between each of the second openings (132) of the inlet pipes (13) and the first opening (31) of the central connection (30) and between each of the first openings (231) of the outlet pipes (23) and the second opening (32) of the central connection (30), the connection device (400) comprising two telescoping sleeves (331, 332) which engage in a sliding manner one in the other and the opposite ends of which define the first opening (31) and the second opening (32) of the central connection (30), and a movement member (70) for the relative sliding of the two telescoping sleeves (331, 332).

10. The distribution apparatus according to claim 9, wherein the telescope-like sleeves (331, 332) can be controlled in terms of relative sliding between an extended configuration and a retracted configuration by pneumatic control chambers (701) and have a plurality of through-holes (800) between the pneumatic control chambers (701) and the interior of the telescope-like sleeves (331, 332), the holes (800) being through-holes which open in the pneumatic control chambers (701) when the telescoping sleeves (331, 332) slide in relative terms between an extended configuration and a retracted configuration and are inaccessible when the telescoping sleeves (331, 332) are in the extended configuration.

\* \* \* \* \*